US010742773B2

United States Patent
Chen

(10) Patent No.: US 10,742,773 B2
(45) Date of Patent: Aug. 11, 2020

(54) PROTOCOL CONVERSION METHOD, PLATFORM, AND PROTOCOL CONVERSION GATEWAY

(71) Applicant: Hangzhou Hikvision System Technology Co., Ltd., Zhejiang (CN)

(72) Inventor: Wei Chen, Zhejiang (CN)

(73) Assignee: HANGZHOU HIKVISION SYSTEM TECHNOLOGY CO., LTD., Hangzhou (CN)

( * ) Notice: Subject to any disclaimer, the term of this patent is extended or adjusted under 35 U.S.C. 154(b) by 67 days.

(21) Appl. No.: 16/071,998

(22) PCT Filed: Mar. 28, 2017

(86) PCT No.: PCT/CN2017/078377
§ 371 (c)(1),
(2) Date: Jul. 23, 2018

(87) PCT Pub. No.: WO2017/181823
PCT Pub. Date: Oct. 26, 2017

(65) Prior Publication Data
US 2019/0028572 A1  Jan. 24, 2019

(30) Foreign Application Priority Data

Apr. 21, 2016 (CN) .......................... 2016 1 0258162

(51) Int. Cl.
*H04L 29/06* (2006.01)
*H04L 12/66* (2006.01)
*H04L 12/24* (2006.01)

(52) U.S. Cl.
CPC .............. *H04L 69/08* (2013.01); *H04L 12/66* (2013.01); *H04L 29/06183* (2013.01);
(Continued)

(58) Field of Classification Search
CPC ..................... H04L 41/0816; H04L 29/06244
See application file for complete search history.

(56) References Cited

U.S. PATENT DOCUMENTS 7,697,951 B1 * 4/2010 Martin .................... H04L 69/08
455/406
2008/0056288 A1 * 3/2008 Furukawa ............... H04L 29/06
370/401
(Continued)

FOREIGN PATENT DOCUMENTS

| CN | 1605180 | 4/2005 |
|---|---|---|
| CN | 1842077 | 10/2006 |

(Continued)

OTHER PUBLICATIONS

Extended European Search Report dated Sep. 5, 2019, from corresponding European Application No. 17785308.2, 14 pages.
Chinese Application No. 201610258162; The First Office Action dated Jun. 26, 2019; 7 pages.
English Translation of International Search Report dated Jun. 19, 2017, from International Application No. PCT/CN2017/078377, 4 pages.

*Primary Examiner* — Redentor Pasia
(74) *Attorney, Agent, or Firm* — Meunier Carlin & Curfman LLC

(57) ABSTRACT

The embodiments of the present application disclose a protocol conversion method, a protocol conversion platform and a protocol conversion gateway to reduce difficulty of information interaction between a superior data platform and a subordinate data platform. With the technical solution provided by the embodiments of the present application, the superior protocol conversion gateway and the subordinate protocol conversion gateway use signaling in compliance with the same third-party signaling standard, and the signaling interacted between the superior data platform and the subordinate data platform does not need to be switched between two video cascade protocols, which reduces the difficulty of developing a gateway, and facilitates the signaling interaction between the superior data platform and the (Continued)

subordinate data platform, and when a superior or subordinate data platform supporting a new video cascade protocol appears, it is only required to configure the superior protocol conversion gateway and the subordinate protocol conversion gateway without developing a new gateway, which further reduces workload of developing a gateway.

16 Claims, 3 Drawing Sheets

(52) U.S. Cl.
CPC .. *H04L 29/06244* (2013.01); *H04L 29/06482* (2013.01); *H04L 41/0816* (2013.01); *H04L 65/103* (2013.01); *H04L 65/104* (2013.01); *H04L 65/605* (2013.01); *H04L 69/18* (2013.01)

(56) References Cited

U.S. PATENT DOCUMENTS

2012/0082165 A1\* 4/2012 Cai .................. H04L 69/08
370/401
2015/0063167 A1 3/2015 Yoo et al.

FOREIGN PATENT DOCUMENTS

| CN | 101123540 A | 2/2008 |
| CN | 102215381 A | 10/2011 |
| CN | 105245427 | 1/2016 |

\* cited by examiner

PROTOCOL CONVERSION METHOD, PLATFORM, AND PROTOCOL CONVERSION GATEWAY

The present application claims the priority to a Chinese patent application No. 201610258162.4 filed with the State Intellectual Property Office of People's Republic of China on Apr. 21, 2016 and entitled "Protocol Conversion Method, Platform, and Protocol Conversion Gateway", which is incorporated herein by reference in its entirety.

TECHNICAL FIELD

The present application relates to the field of security technologies, and in particular to a protocol conversion method, a platform, and a protocol conversion gateway.

BACKGROUND

At present, in different fields (for example, the public security field and the transportation field), a superior data platform of a superior department aggregates the video resources of a subordinate data platform of a subordinate department to achieve centralized control and management. In a case where the data platform of the superior department and the data platform of the subordinate department use different protocols, the signaling interaction between the superior data platform and the subordinate data platform involves the protocol conversion problem. At present, for this problem, a gateway is generally used to convert a signaling sent by the superior data platform into a signaling supported by the protocol of the subordinate data platform, and convert a response of the subordinate data platform into a response supported by the protocol of the superior data platform.

However, with the method above, whenever a subordinate data platform using a different protocol is added, a gateway has to be developed to implement the protocol conversion between the superior data platform and this subordinate data platform. When there is a big difference between the protocols of the superior data platform and the subordinate data platform, it is very difficult for developers to develop a new gateway and the difficulty of information interaction between the superior data platform and the subordinate data platform is increased.

SUMMARY

The purpose of embodiments of the present application is to provide a protocol conversion method, a protocol conversion platform and a protocol conversion gateway to reduce difficulty of information interaction between a superior data platform and a subordinate data platform.

In order to achieve the purpose above, embodiments of the present application disclose a protocol conversion platform, which is applied in a video resource aggregation system comprising a superior data platform and a subordinate data platform, wherein the superior data platform and the subordinate data platform respectively support at least one type of video cascade protocol, the protocol conversion platform comprises at least one superior protocol conversion gateway interfacing with the superior data platform, and at least one subordinate protocol conversion gateway interfacing with the subordinate data platform, the superior protocol conversion gateway is configured for receiving a first instruction sent by the first video cascade protocol-based superior data platform to the second video cascade protocol-based subordinate data platform, parsing the first instruction according to the first video cascade protocol supported by the superior protocol conversion gateway, converting the first instruction into a first signaling under a preset third-party signaling standard, and sending the first signaling to the subordinate protocol conversion gateway interfacing with the subordinate data platform;

the subordinate protocol conversion gateway is configured for parsing, according to the third-party signaling standard, the received first signaling sent by the superior protocol conversion gateway, converting the first signaling into a second instruction under the second video cascade protocol supported by the subordinate data platform that interfaces with the subordinate protocol conversion gateway, and sending the second instruction to the subordinate data platform;

the subordinate protocol conversion gateway is further configured for parsing, according to the second video cascade protocol supported by the subordinate protocol conversion gateway, a received third instruction sent by the subordinate data platform, converting the third instruction into a second signaling under the third-party signaling standard, and sending the second signaling to the superior protocol conversion gateway, wherein the third instruction is a second video cascade protocol-based instruction that is sent to the subordinate protocol conversion gateway by the subordinate data platform according to a processing result which is obtained through processing the received second instruction sent by the subordinate protocol conversion gateway by the subordinate data platform; and the superior protocol conversion gateway is further configured for parsing, according to the third-party signaling standard, the received second signaling sent by the subordinate protocol conversion gateway, converting the second signaling into a fourth instruction under the first video cascade protocol, and sending the fourth instruction to the superior data platform.

Optionally, the subordinate protocol conversion gateway is further configured for receiving a video resource sent by the subordinate data platform, and sending the video resource to the superior protocol conversion gateway;

the superior protocol conversion gateway is further configured for encapsulating the received video resource according to a video encapsulation format of the superior data platform, and sending the encapsulated video resource to the superior data platform.

Optionally, the superior protocol conversion gateway is configured for parsing contents in the first instruction, calling an interface corresponding to the contents in a set of interfaces of the preset third-party signaling standard, and generating a first signaling under the third-party signaling standard containing this interface according to the contents;

the subordinate protocol conversion gateway is configured for converting the third instruction into a second signaling under the third-party signaling standard according to information about the interface contained in the first signaling.

Optionally, when the superior data platform supports N types of video cascade protocols, the protocol conversion platform includes N superior protocol conversion gateways, each of which interfaces with one type of superior data platform, wherein N is an integer greater than or equal to 2;

when the subordinate data platform supports M types of video cascade protocols, the protocol conversion platform includes M subordinate protocol conversion gateways, each of which interfaces with one type of subordinate data platform, wherein M is an integer greater than or equal to 2.

Optionally, when the superior data platform supports N types of video cascade protocols, the protocol conversion platform includes S superior protocol conversion gateways, each of which interfaces with a plurality of types of superior data platforms, wherein N is an integer greater than or equal to 2 and S is an integer less than N and greater than or equal to 1;

when the subordinate data platform supports M types of video cascade protocols, the protocol conversion platform includes T subordinate protocol conversion gateways, each of which interfaces with a plurality of types of subordinate data platforms, wherein M is an integer greater than or equal to 2 and T is an integer less than N and greater than or equal to 1.

The embodiments of the present application provide a protocol conversion method, which is applied in a video resource aggregation system including a superior data platform, a subordinate data platform and a protocol conversion platform, wherein the superior data platform and the subordinate data platform respectively support at least one type of video cascade protocol, the protocol conversion platform includes at least one superior protocol conversion gateway interfacing with the superior data platform, and at least one subordinate protocol conversion gateway interfacing with the subordinate data platform, the method includes:

receiving, by the superior protocol conversion gateway, a first instruction sent by the first video cascade protocol-based superior data platform that interfaces with the superior protocol conversion gateway to the second video cascade protocol-based subordinate data platform, parsing the first instruction according to the first video cascade protocol supported by the superior protocol conversion gateway; converting the first instruction into a first signaling under a preset third-party signaling standard, and sending the first signaling to the subordinate protocol conversion gateway interfacing with the subordinate data platform;

parsing, by the subordinate protocol conversion gateway, according to the third-party signaling standard, the received first signaling sent by the superior protocol conversion gateway, converting the first signaling into a second instruction under the second video cascade protocol supported by the subordinate data platform that interfaces with the subordinate protocol conversion gateway, and sending the second instruction to the subordinate data platform;

performing, by the subordinate data platform, corresponding processing according to the received second instruction sent by the subordinate protocol conversion gateway, and sending a second video cascade protocol-based third instruction to the subordinate protocol conversion according to the result of the processing;

parsing, by the subordinate protocol conversion gateway, according to the second video cascade protocol supported by the subordinate protocol conversion gateway, the received third instruction sent by the subordinate data platform, converting the third instruction into a second signaling under the third-party signaling standard, and sending the second signaling to the superior protocol conversion gateway;

parsing, by the superior protocol conversion gateway, according to the third-party signaling standard, the received second signaling sent by the subordinate protocol conversion gateway, converting the second signaling into a fourth instruction under the first video cascade protocol, and sending the fourth instruction to the superior data platform.

Optionally, when the first instruction contains video resource calling information, the method further includes:

when the first instruction is a video preview instruction or a video playback instruction, performing, by the subordinate data platform, processing according to the second instruction, and sending a video resource to the subordinate protocol conversion gateway according to the result of the processing;

receiving, by the subordinate protocol conversion gateway, the video resource sent by the subordinate data platform, and sending the video resource to the superior protocol conversion gateway;

encapsulating, by the superior protocol conversion gateway, the video resource according to a video encapsulation format of the superior data platform, and sending the encapsulated video resource to the superior data platform.

Optionally, converting the first instruction into a first signaling under a preset third-party signaling standard includes:

parsing contents in the first instruction, calling an interface corresponding to the contents in a set of interfaces of the preset third-party signaling standard, and generating a first signaling under the third-party signaling standard containing this interface according to the contents;

converting the third instruction into a second signaling under the third-party signaling standard includes:

converting the third instruction into a second signaling under the third-party signaling standard according to information about the interface contained in the first signaling.

Optionally, when the superior data platform supports N types of video cascade protocols, the protocol conversion platform includes N superior protocol conversion gateways, each of which interfaces with one type of superior data platform, wherein N is an integer greater than or equal to 2;

when the subordinate data platform supports M types of video cascade protocols, the protocol conversion platform includes M subordinate protocol conversion gateways, each of which interfaces with one type of subordinate data platform, wherein M is an integer greater than or equal to 2.

Optionally, when the superior data platform supports N types of video cascade protocols, the protocol conversion platform includes S superior protocol conversion gateways, each of which interfaces with a plurality of types of superior data platforms, wherein N is an integer greater than or equal to 2 and S is an integer less than N and greater than or equal to 1;

when the subordinate data platform supports M types of video cascade protocols, the protocol conversion platform includes T subordinate protocol conversion gateways, each of which interfaces with a plurality of types of subordinate data platforms, wherein M is an integer greater than or equal to 2 and T is an integer less than N and greater than or equal to 1.

The embodiments of the present application provide a protocol conversion gateway, which interfaces with a superior data platform or with a subordinate data platform, and supports at least one type of video cascade protocol, wherein the protocol conversion gateway at least includes: a protocol module and a standard signaling adaptation module;

the protocol module is configured for receiving an instruction sent by the data platform, parsing and sending the instruction according to a video cascade protocol supported by the protocol module; and receiving the parsed signaling sent by the standard signaling adaptation module in the same protocol conversion gateway as the protocol module, converting the parsed instruction according to the video cascade protocol supported by the protocol module and sending the parsed instruction to the data platform;

the standard signaling adaptation module is configured for receiving the parsed instruction sent by the protocol module in the same protocol conversion gateway as the standard signaling adaptation module, converting the instruction into a signaling under a preset third-party signaling standard, and sending the signaling converted under the preset third-party signaling standard to a standard signaling adaptation module of another protocol conversion gateway; and receiving a signaling under the third-party signaling standard sent by a standard signaling adaptation module of another protocol conversion gateway, parsing the received signaling according to the third-party signaling standard, and sending the parsed signaling to the protocol module in the same protocol conversion gateway as the standard signaling adaptation module.

Optionally, when the protocol conversion gateway interfaces with a superior data platform, the protocol module is configured for receiving a first instruction sent by the superior data platform to a subordinate data platform, parsing the first instruction according to a first video cascade protocol supported by the protocol module, and sending the first instruction to the standard signaling adaptation module in the same protocol conversion gateway as the protocol module; the standard signaling adaptation module is configured for receiving the parsed first instruction sent by the protocol module in the same protocol conversion gateway as the standard signaling adaptation module, converting the first instruction into a first signaling under the preset third-party signaling standard, and sending the first signaling to a standard signaling adaptation module in a protocol conversion gateway interfacing with the subordinate data platform;

when the protocol conversion gateway interfaces with a subordinate data platform, the standard signaling adaptation module is configured for parsing, according to the third-party signaling standard, the received first signaling sent by a standard signaling adaptation module in a protocol conversion gateway interfacing with a superior data platform, and sending the first signaling to a protocol module in the same protocol conversion gateway as the standard signaling adaptation module; the protocol module is configured for receiving the parsed first signaling sent by the standard signaling adaptation module, converting the first signaling into a second instruction under a second video cascade protocol supported by the subordinate data platform that interfaces with the protocol module, and sending the second instruction to the subordinate data platform, and receiving a third instruction sent by the subordinate data platform to the superior data platform, parsing the received third instruction according to the second video cascade protocol supported by the protocol module, and sending the third instruction to the standard signaling adaptation module in the same protocol conversion gateway as the protocol module, wherein the third instruction is a second video cascade protocol-based instruction that is sent to the subordinate protocol conversion gateway by the subordinate data platform according to a processing result which is obtained through processing the received second instruction sent by the subordinate protocol conversion gateway by the subordinate data platform; the standard signaling adaptation module is further configured for receiving the parsed third instruction sent by the protocol module in the same protocol conversion gateway as the standard signaling adaptation module, converting the third instruction into a second signaling under the preset third-party signaling standard, and sending the second signaling to a standard signaling adaptation module in a protocol conversion gateway interfacing with the superior data platform;

the standard signaling adaptation module in the protocol conversion gateway interfacing with the superior data platform is further configured for parsing, according to the third-party signaling standard, the received second signaling sent by a standard signaling adaptation module in a protocol conversion gateway interfacing with a subordinate data platform, and sending the second signaling to a protocol module in the same protocol conversion gateway as the standard signaling adaptation module; the protocol module in the protocol conversion gateway interfacing with the superior data platform is further configured for receiving the parsed second signaling sent by the standard signaling adaptation module in the same protocol conversion gateway as the protocol module, and converting the second signaling into a fourth instruction under the first video cascade protocol, and sending the fourth instruction to the superior data platform.

Optionally, when the protocol conversion gateway interfaces with a superior data platform, the protocol conversion gateway further includes a transcoding module;

the transcoding module is configured for receiving a video resource sent by the protocol conversion gateway that interfaces with the subordinate data platform, encapsulating the video resource according to a video encapsulation format of the superior data platform that interfaces with this transcoding module, and sending the encapsulated video resource to the superior data platform that interfaces with this transcoding module.

Optionally, the standard signaling adaptation module is configured for parsing contents in an instruction, calling an interface corresponding to the contents in a set of interfaces of the preset third-party signaling standard, and generating a first signaling under the third-party signaling standard containing this interface according to the contents.

Optionally, when the protocol conversion gateway supports N types of video cascade protocols, the protocol conversion gateway includes N protocol modules, and each of the protocol modules supports one type of video cascade protocol respectively; or, when the protocol conversion gateway supports N types of video cascade protocols, the protocol conversion gateway includes M protocol modules, and each of the protocol modules supports one or more types of video cascade protocols;

N is an integer greater than or equal to 2, and M is an integer less than N and greater than or equal to 1.

The embodiments of the present application provide a protocol conversion gateway, which interfaces with a superior data platform or with a subordinate data platform, and supports at least one type of video cascade protocol, and the protocol conversion gateway comprises: a housing, a processor, a memory, a circuit board, and a power supply circuit, wherein the circuit board is disposed inside the space enclosed by the housing, the processor and the memory are provided on the circuit board; the power supply circuit is configured for supplying power for various circuits or components of the protocol conversion gateway; the memory is configured for storing executable program codes; and the processor executes the executable program codes stored in the memory for:

receiving an instruction sent by a data platform, parsing the instruction according to a video cascade protocol supported by the protocol conversion gateway; converting the instruction into a signaling under a preset third-party signaling standard, and sending the signaling converted under the third-party signaling standard to another protocol conversion gateway; and receiving a signaling under the third-party signaling standard sent by another protocol conversion gateway, parsing the received signaling according to the third-party signaling standard, and converting the parsed signaling according to the video cascade protocol supported by the protocol conversion gateway and sending the signaling to the data platform.

The embodiments of the present application provide executable program codes, wherein the executable program code is executed to implement the protocol conversion method provided by the embodiments of the present application.

The embodiments of the present application provide a storage medium, wherein the storage medium is used for storing executable program codes, which is executed to implement the protocol conversion method provided by the embodiments of the present application.

It can be seen from the technical solution above that the embodiments of the present application provide a protocol conversion method, a protocol conversion platform and a protocol conversion gateway. A superior protocol conversion gateway in the protocol conversion platform receives a first instruction sent by the first video cascade protocol-based superior data platform to the second video cascade protocol-based subordinate data platform; parses the first instruction according to the first video cascade protocol supported by the superior protocol conversion gateway; and converts the first instruction into a first signaling under a preset third-party signaling standard and sends the first signaling to the subordinate protocol conversion gateway. The subordinate protocol conversion gateway parses the first signaling, converts the first signaling into a second instruction under the second video cascade protocol supported by the subordinate data platform that interfaces with it, and sends the second instruction to the subordinate data platform. At the same time, the subordinate protocol conversion gateway receives a third instruction sent by the subordinate data platform, converts the third instruction into a second signaling under the third-party signaling standard and sends the second signaling to the superior protocol conversion gateway; the superior protocol conversion gateway parses the second signaling according to the third-party signaling standard, and converts the second signaling into a fourth instruction under the first video cascade protocol and sends the fourth instruction to the superior data platform. With the technical solution provided by the embodiments of the present application, the superior protocol conversion gateway and the subordinate protocol conversion gateway use signaling in compliance with the same third-party signaling standard, and the signaling interacted between the superior data platform and the subordinate data platform does not need to be switched between two video cascade protocols, which reduces the difficulty of developing a gateway, and facilitates the signaling interaction between the superior data platform and the subordinate data platform, and when a superior or subordinate data platform supporting a new video cascade protocol appears, it is only required to configure the superior protocol conversion gateway and the subordinate protocol conversion gateway without developing a new gateway, which further reduces workload of developing a gateway.

BRIEF DESCRIPTION OF THE DRAWINGS

In order to explain the technical solution of embodiments of the present application or of the prior art more clearly, the following briefly introduces the accompanying drawings required for describing the embodiments or the prior art. Obviously, the drawings described below are just those for some embodiments of the present application and other drawings can be obtained by those of ordinary skills in the art without any creative efforts based on these drawings.

DETAILED DESCRIPTION

The technical solution of the application will be described in detail with reference to the drawings of embodiments of the present application. Obviously, the embodiments described are merely some of the embodiments of the present application, instead of all the embodiments. All other embodiments obtained by those of ordinary skills in the art based on the embodiments herein without any creative efforts are within the scope of the present application.

In order to solve the problem in prior art, the embodiments of the present application provide a protocol conversion method, a protocol conversion platform, and a protocol conversion gateway. The following first introduces the protocol conversion platform provided by an embodiment of the present application.

Figure 1:
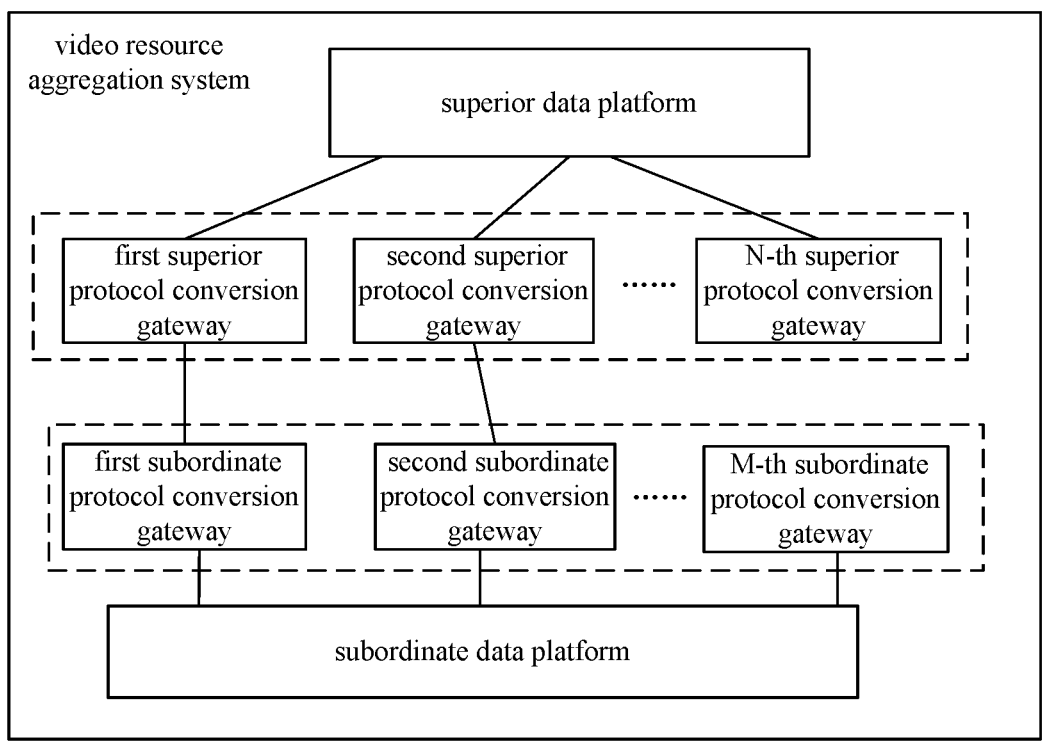
FIG. 1 is a schematic structural diagram of a video resource aggregation system provided by an embodiment of the present application.

It should be noted that the protocol conversion platform provided by an embodiment of the present application is preferably applied to a video resource aggregation system as shown in FIG. 1, which is a schematic structural diagram of the video resource aggregation system provided by an embodiment of the present application. The video resource aggregation system can include a superior data platform and a subordinate data platform, wherein the superior data platform and the subordinate data platform respectively support at least one type of video cascade protocol. The protocol conversion platform includes at least one superior protocol conversion gateway interfacing with the superior data platform, and at least one subordinate protocol conversion gateway interfacing with the subordinate data platform.

In the protocol conversion platform, the superior protocol conversion gateway is configured for receiving a first instruction sent by the first video cascade protocol-based superior data platform to the second video cascade protocol-based subordinate data platform, parsing the first instruction according to the first video cascade protocol supported by the superior protocol conversion gateway, converting the first instruction into a first signaling under a preset third-party signaling standard, and sending the first signaling to the subordinate protocol conversion gateway interfacing with the subordinate data platform.

The subordinate protocol conversion gateway is configured for parsing, according to the third-party signaling standard, the received first signaling sent by the superior protocol conversion gateway, converting the first signaling into a second instruction under the second video cascade protocol supported by the subordinate data platform that interfaces with the subordinate protocol conversion gateway, and sending the second instruction to the subordinate data platform.

The subordinate protocol conversion gateway is configured for parsing, according to the second video cascade protocol supported by the subordinate protocol conversion gateway, a received third instruction sent by the subordinate data platform, converting the third instruction into a second signaling under the third-party signaling standard, and sending the second signaling to the superior protocol conversion gateway, wherein the third instruction is a second video cascade protocol-based instruction that is sent to the subordinate protocol conversion gateway by the subordinate data platform according to a processing result which is obtained through processing the received second instruction sent by the subordinate protocol conversion gateway by the subordinate data platform.

The superior protocol conversion gateway is further configured for parsing, according to the third-party signaling standard, the received second signaling sent by the subordinate protocol conversion gateway; converting the second signaling into a fourth instruction under the first video cascade protocol; and sending the fourth instruction to the superior data platform.

Specifically, the superior data platform and the subordinate data platform in the video resource aggregation system respectively support at least one type of video cascade protocol. The video resource aggregation system further includes a protocol conversion platform including at least one superior protocol conversion gateway interfacing with the superior data platform, and at least one subordinate protocol conversion gateway interfacing with the subordinate data platform. As shown in FIG. 1, there are a superior data platform and a subordinate data platform, wherein the superior data platform supports M types of video cascade protocols, and the subordinate data platform supports N types of video cascade protocols, wherein M and N are integers not less than 1, and M and N may or may not be equal. The protocol conversion platform includes N superior protocol conversion gateways, which are the first superior protocol conversion gateway, the second superior protocol conversion gateway, . . . , the N-th superior protocol conversion gateway. The protocol conversion platform further includes M subordinate protocol conversion gateways, which are the first subordinate protocol conversion gateway, the second subordinate protocol conversion gateway, . . . , the M-th subordinate protocol conversion gateway.

In an embodiment of the present application, a superior protocol conversion gateway can interface with one superior data platform, and can also interface with a plurality of superior data platforms simultaneously. Similarly, a subordinate protocol conversion gateway can interface with one subordinate data platform, and can also interface with a plurality of subordinate data platforms simultaneously.

When interfacing with one superior data platform, the superior protocol conversion gateway supports one video cascade protocol. When interfacing with a plurality of superior data platforms, the superior protocol conversion gateway supports a plurality of video cascade protocols. Similarly, a subordinate protocol conversion gateway can interface with one subordinate data platform, and can also interface with a plurality of subordinate data platforms simultaneously. When interfacing with one subordinate data platform, the subordinate protocol conversion gateway supports one video cascade protocol. When interfacing with a plurality of subordinate data platforms, the subordinate protocol conversion gateway supports a plurality of video cascade protocols. The video cascade protocols supported by the data platforms can include: GB28181, DB33, GB28059 and the like.

Alternatively, in the embodiment of the present application, when one superior data platform supports N types of video cascade protocols, the protocol conversion platform can include N superior protocol conversion gateways, each of which interfaces with one type of superior data platform, wherein N is an integer greater than or equal to 2;

when the subordinate data platform supports M types of video cascade protocols, the protocol conversion platform includes M subordinate protocol conversion gateways, each of which interfaces with one type of subordinate data platform, wherein M is an integer greater than or equal to 2.

Still alternatively, each protocol conversion gateway in the embodiment of the present application can interface with a plurality of types of data platforms. Specifically, when the superior data platform supports N types of video cascade protocols, the protocol conversion platform includes S superior protocol conversion gateways, each of which interfaces with a plurality of types of superior data platforms, wherein N is an integer greater than or equal to 2 and S is an integer less than N and greater than or equal to 1;

when the subordinate data platform supports M types of video cascade protocols, the protocol conversion platform includes T subordinate protocol conversion gateways, each of which interfaces with a plurality of types of subordinate data platforms, wherein M is an integer greater than or equal to 2 and T is an integer less than N and greater than or equal to 1.

Specifically, when the superior data platform supports N types of video cascade protocols, the protocol conversion platform includes S superior protocol conversion gateways, and when interfacing with superior data platforms, each of the superior protocol conversion gateways interfaces with a plurality of types of superior data platforms, that is, the superior data platform supports a plurality of types of video cascade protocols, specifically more than one video cascade protocols. The subordinate data platform and subordinate protocol conversion gateways have a similar configuration.

In the embodiment of the present application, each of the superior and subordinate protocol conversion gateways can parse, based on the video cascade protocols supported by itself, an instruction sent by a corresponding data platform that interfaces with it, and convert the instruction into a signaling under a preset third-party signaling standard, and then send the signaling to a corresponding data platform.

Furthermore, as the superior protocol conversion gateway and the subordinate protocol conversion gateway interact with each other by using signaling in a standard format under a third-party signaling standard, therefore when a superior or subordinate data platform supporting a new video cascade protocol appears, it is only required to configure the superior protocol conversion gateway and the subordinate protocol conversion gateway without developing a new gateway, which further reduces workload of developing a gateway.

That is, in the embodiments of the present application, when a new type of video cascade protocol is added to the superior data platform or the subordinate data platform, a protocol conversion gateway supporting the video cascade protocol can be added to the superior data platform or to the subordinate data platform, or the protocol conversion gateway of one of the data platforms can be reconfigured to support this newly added video cascade protocol.

In a specific embodiment of the present application, the superior protocol conversion gateway is configured for parsing contents in the first instruction, calling an interface corresponding to the contents in a set of interfaces of the preset third-party signaling standard, and generating a first signaling under the third-party signaling standard containing this interface according to the contents.

The subordinate protocol conversion gateway is configured for converting the third instruction into a second signaling under the third-party signaling standard according to the information about the interface contained in the first signaling.

The instruction includes a directory query instruction, device query instruction, video query instruction, video search instruction, cloud platform control instruction, device restart instruction and video download instruction.

Specifically, in the embodiment of the present application, the superior and the subordinate protocol conversion gateways support a set of resource accessing and calling interfaces of a third-party standard format, each of which corresponds to the contents in an instruction and implements conversion of that instruction. The superior and the subordinate protocol conversion gateways call an interface corresponding to the contents in a parsed instruction in a set of interfaces of a preset third-party signaling standard, so as to generate a signaling under the third-party signaling standard containing this interface according to the contents in the instruction.

If the instruction contains information about video resource calling, the instruction can also include, for example, a video preview instruction, video playback instruction and the like.

When the instruction is a video preview instruction or a video playback instruction, in the protocol conversion platform:

the subordinate protocol conversion gateway is further configured for receiving a video resource sent by the subordinate data platform, and sending the video resource to the superior protocol conversion gateway;

the superior protocol conversion gateway is further configured for encapsulating the received video resource according to a video encapsulation format of the superior data platform, and sending the encapsulated video resource to the superior data platform.

When the instruction is a video preview instruction or a video playback instruction, the subordinate data platform is required to send its video resource to the superior data platform. After receiving a video resource forwarded by the subordinate protocol conversion gateway, the superior protocol conversion gateway encapsulates the video resource according to the video encapsulation format of the corresponding superior data platform, and sends the encapsulated video resource to the superior data platform.

With the technical solution provided by the embodiments of the present application, a superior protocol conversion gateway and a subordinate protocol conversion gateway use signaling in compliance with the same third-party signaling standard, and the signaling interacted between the superior data platform and the subordinate data platform does not need to be switched between two video cascade protocols, which reduces the difficulty of developing a gateway, and facilitates the signaling interaction between the superior data platform and the subordinate data platform.

Figure 2:
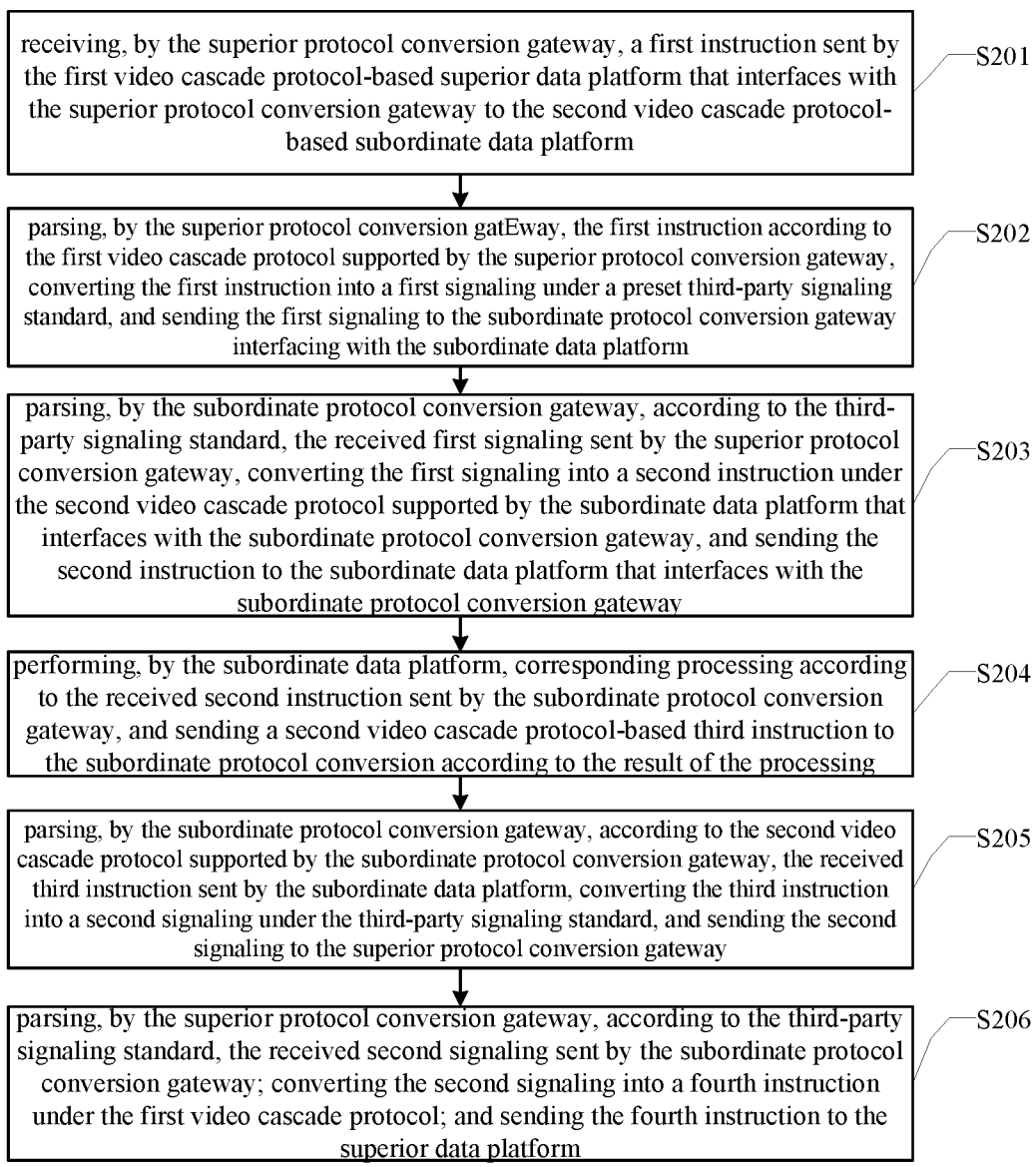
FIG. 2 is a schematic flowchart of a protocol conversion method provided by an embodiment of the present application.

FIG. 2 is a schematic flowchart of a protocol conversion method provided by an embodiment of the present application, and the method includes the following steps:

S201: receiving, by the superior protocol conversion gateway, a first instruction sent by the first video cascade protocol-based superior data platform that interfaces with the superior protocol conversion gateway to the second video cascade protocol-based subordinate data platform.

The first instruction contains identification information of the subordinate data platform, and the identification information may be, for example, address information of the subordinate data platform, wherein the first instruction is based on the first video cascade protocol.

S202: parsing, by the superior protocol conversion gateway, the first instruction according to the first video cascade protocol supported by the superior protocol conversion gateway; converting the first instruction into a first signaling under a preset third-party signaling standard, and sending the first signaling to the subordinate protocol conversion gateway interfacing with the subordinate data platform.

S203: parsing, by the subordinate protocol conversion gateway, according to the third-party signaling standard, the received first signaling sent by the superior protocol conversion gateway, converting the first signaling into a second instruction under the second video cascade protocol supported by the subordinate data platform that interfaces with the subordinate protocol conversion gateway, and sending the second instruction to the subordinate data platform that interfaces with the subordinate protocol conversion gateway.

S204: performing, by the subordinate data platform, corresponding processing according to the received second instruction sent by the subordinate protocol conversion gateway, and sending a second video cascade protocol-based third instruction to the subordinate protocol conversion according to the result of the processing.

S205: parsing, by the subordinate protocol conversion gateway, according to the second video cascade protocol supported by the subordinate protocol conversion gateway, the received third instruction sent by the subordinate data platform, converting the third instruction into a second signaling under the third-party signaling standard, and sending the second signaling to the superior protocol conversion gateway.

S206: parsing, by the superior protocol conversion gateway, according to the third-party signaling standard, the received second signaling sent by the subordinate protocol conversion gateway; converting the second signaling into a fourth instruction under the first video cascade protocol; and sending the fourth instruction to the superior data platform.

In the embodiment of the present application, a superior protocol conversion gateway can interface with one superior data platform, and can also interface with a plurality of superior data platforms simultaneously. Similarly, a subordinate protocol conversion gateway can interface with one subordinate data platform, and can also interface with a plurality of subordinate data platforms simultaneously.

When interfacing with one superior data platform, the superior protocol conversion gateway supports one video cascade protocol. When interfacing with a plurality of superior data platforms, the superior protocol conversion gateway supports a plurality of video cascade protocols. Similarly, a subordinate protocol conversion gateway can interface with one subordinate data platform, and can also interface with a plurality of subordinate data platforms simultaneously. When interfacing with one subordinate data platform, the subordinate protocol conversion gateway supports one video cascade protocol. When interfacing with a plurality of subordinate data platforms, the subordinate protocol conversion gateway supports a plurality of video cascade protocols.

Alternatively, in the embodiment of the present application, when one superior data platform supports N types of video cascade protocols, the protocol conversion platform can include N superior protocol conversion gateways, each of which interfaces with one type of superior data platform, wherein N is an integer greater than or equal to 2;

when the subordinate data platform supports M types of video cascade protocols, the protocol conversion platform includes M subordinate protocol conversion gateways, each of which interfaces with one type of subordinate data platform, wherein M is an integer greater than or equal to 2.

Still alternatively, each protocol conversion gateway in the embodiments of the present application can interface with a plurality of types of data platforms. Specifically, when the superior data platform supports N types of video cascade protocols, the protocol conversion platform includes S superior protocol conversion gateways, each of which interfaces with a plurality of types of superior data platforms, wherein N is an integer greater than or equal to 2 and S is an integer less than N and greater than or equal to 1;

when the subordinate data platform supports M types of video cascade protocols, the protocol conversion platform includes T subordinate protocol conversion gateways, each of which interfaces with a plurality of types of subordinate data platforms, wherein M is an integer greater than or equal to 2 and T is an integer less than N and greater than or equal to 1.

Specifically, when the superior data platform supports N types of video cascade protocols, the protocol conversion platform includes S superior protocol conversion gateways, and when interfacing with superior data platforms, each of the superior protocol conversion gateways interfaces with a plurality of types of superior data platforms, that is, the superior data platform supports a plurality of types of video cascade protocols, specifically more than one video cascade protocols. The subordinate data platform and subordinate protocol conversion gateways have a similar configuration.

In the embodiment of the present application, each of the superior and subordinate protocol conversion gateways can parse, based on the video cascade protocols supported by itself, an instruction sent by a corresponding data platform that interfaces with it, and convert the instruction into a signaling under a preset third-party signaling standard, and then send the signaling to a corresponding data platform.

Furthermore, as the superior protocol conversion gateway and the subordinate protocol conversion gateway interact with each other by using signaling in a standard format under a third-party signaling standard, therefore when a superior or subordinate data platform supporting a new video cascade protocol appears, it is only required to configure the superior protocol conversion gateway and the subordinate protocol conversion gateway without developing a new gateway, which further reduces workload of developing a gateway.

That is, in the embodiments of the present application, when a new type of video cascade protocol is added to the superior data platform or the subordinate data platform, a protocol conversion gateway supporting the video cascade protocol can be added to the superior data platform or to the subordinate data platform, or the protocol conversion gateway of one of the data platforms can be reconfigured to support this newly added video cascade protocol.

In a specific embodiment of the present application, converting the first instruction into a first signaling under a preset third-party signaling standard includes:

parsing the contents in the first instruction; calling an interface corresponding to the contents in a set of interfaces of the preset third-party signaling standard, and generating a first signaling under the third-party signaling standard containing this interface according to the contents;

and converting the third instruction into a second signaling under the third-party signaling standard includes:

converting the third instruction into a second signaling under the third-party signaling standard according to the information about the interface contained in the first signaling.

The instruction includes a directory query instruction, device query instruction, video query instruction, video search instruction, cloud platform control instruction, device restart instruction and video download instruction.

Specifically, in the embodiment of the present application, the superior and the subordinate protocol conversion gateways support a set of resource accessing and calling interfaces of a third-party signaling standard format, each of which corresponds to the contents in an instruction and implements conversion of that instruction. The superior and the subordinate protocol conversion gateways call an interface corresponding to the contents in a parsed instruction in a set of interfaces of a preset third-party signaling standard, so as to generate a signaling under the preset third-party signaling standard containing this interface according to the contents in the instruction.

If the instruction contains information about video resource calling, the instruction can also include, for example, a video preview instruction, video playback instruction and the like.

On the basis of the embodiment above, when the first instruction contains video resource calling information, in another embodiment of the present application, the method further includes:

when the first instruction is a video preview instruction or a video playback instruction, the subordinate data platform performing processing according to the second instruction, and sending a video resource to the subordinate protocol conversion gateway according to the result of the processing;

the subordinate protocol conversion gateway receiving a video resource sent by the subordinate data platform, and sending the video resource to the superior protocol conversion gateway;

the superior protocol conversion gateway encapsulating the video resource according to a video encapsulation format of the superior data platform, and sending the encapsulated video resource to the superior data platform.

When the instruction is a video preview instruction or a video playback instruction, the subordinate data platform is required to send its video resource to the superior data platform. After receiving the video resource forwarded by the subordinate protocol conversion gateway, the superior protocol conversion gateway encapsulates the video resource according to the video encapsulation format of the corresponding superior data platform, and sends the encapsulated video resource to the superior data platform.

With the technical solution provided by the embodiments of the present application, the superior protocol conversion gateway and the subordinate protocol conversion gateway use signaling in compliance with the same third-party signaling standard, and the signaling interacted between the superior data platform and the subordinate data platform does not need to be switched between two video cascade protocols, which reduces the difficulty of developing a gateway, and facilitates the signaling interaction between the superior data platform and the subordinate data platform.

A specific embodiment will be described below.

FIG. 1 is taken as an example for explanation, for example, a first superior data platform in superior data platforms is a national standard platform, the superior protocol conversion gateway that interfaces with the superior data platforms is a national standard gateway, a first subordinate data platform is a port protocol platform, a first subordinate protocol conversion gateway that interfaces with the first subordinate data platform is a port protocol gateway.

The national standard platform sends a first instruction to the port protocol platform, and the first instruction will be first sent to the national standard gateway interfacing with the national standard platform. The first instruction can be, for example, a directory query instruction, device query instruction, video query instruction, video search instruction, cloud platform control instruction, device restart instruction, and video download instruction, and the like.

The national standard gateway parses the first instruction according to a national standard protocol supported by itself to obtain the contents in the first instruction, calls an interface corresponding to the contents in a set of interfaces under a preset third-party signaling standard to generate a first signaling under the preset third-party signaling standard containing the interface according to the contents. The national standard gateway sends the first signaling to the port protocol gateway.

The port protocol gateway parses the received first signaling according to the third-party signaling standard, and converts the first signaling into a second instruction under the second video cascade protocol supported by the subordinate data platform that interfaces with the port protocol gateway, and sends the second instruction to the port protocol platform.

The port protocol platform receives the second instruction sent by the port protocol gateway, performs corresponding processing according to the second instruction, and sends a third instruction based on a port protocol to the port protocol gateway according to the result of the processing. The port protocol gateway receives the third instruction sent by the port protocol platform, parses the third instruction according to the port protocol supported by itself, converts the third instruction into a second signaling under the preset third-party signaling standard according to information about the interface contained in the first signaling, and sends the second signaling to the national standard gateway.

The national standard gateway parses, according to the third-party signaling standard, the received second signaling sent by the port protocol gateway, and converts the second signaling into a fourth instruction under the first video cascade protocol, and sends the fourth instruction to the national standard platform.

When the first instruction contains video resource calling information, the port protocol platform performs processing according to the second instruction, and sends a video resource to the port protocol gateway according to the result of the processing. The port protocol gateway receives the video resource sent by the port protocol platform, and sends the video resource to the national standard gateway.

The national standard gateway encapsulates the video resource according to the video encapsulation format of the national standard platform, and sends the encapsulated video resource to the national standard platform.

Figure 3:
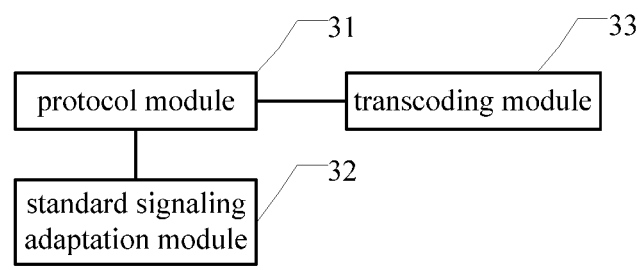
FIG. 3 is a schematic structural diagram of a protocol conversion gateway provided by an embodiment of the present application.

FIG. 3 is a schematic structural diagram of a protocol conversion gateway provided by an embodiment of the present application. The protocol conversion gateway interfaces with a superior data platform or with a subordinate data platform, and the protocol conversion gateway supports at least one type of video cascade protocol. The protocol conversion gateway includes at least a protocol module 31 and a standard signaling adaptation module 32.

The protocol module 31 is configured for receiving an instruction sent by the data platform, parsing and sending the instruction according to a video cascade protocol supported by the protocol module; and receiving the parsed signaling sent by the standard signaling adaptation module in the same protocol conversion gateway as the protocol module, converting the parsed instruction according to the video cascade protocol supported by the protocol module and sending the parsed instruction to the data platform.

The standard signaling adaptation module 32 is configured for receiving the parsed instruction sent by the protocol module in the same protocol conversion gateway as the standard signaling adaptation module 32, converting the instruction into a signaling under a preset third-party signaling standard, and sending the signaling converted under the preset third-party signaling standard to a standard signaling adaptation module of another protocol conversion gateway; and receiving a signaling under the third-party signaling standard sent by a standard signaling adaptation module of another protocol conversion gateway, parsing the received signaling according to the third-party signaling standard, and sending the parsed signaling to the protocol module in the same protocol conversion gateway as the standard signaling adaptation module 32.

The video cascade protocols supported by the protocol module can include: GB28181, DB33, GB28059 and the like.

The standard signaling adaptation module provides a set of network interfaces based on TCP+UPD, similar to interfaces for communication between a gateway client and a gateway. All functions of the gateway can be implemented by calling this set of interfaces. Generally, certain core functions of the standard signaling adaptation module can be a standalone ddl files that provides a set of standard SDK interfaces for calling.

Specifically, when the protocol conversion gateway interfaces with a superior data platform, the protocol module 31 is specifically configured for receiving a first instruction sent by the superior data platform to a subordinate data platform, parsing the first instruction according to a first video cascade protocol supported by the protocol module, and sending the first instruction to the standard signaling adaptation module 32 in the same protocol conversion gateway as the protocol module; the standard signaling adaptation module 32 is configured for receiving the parsed first instruction sent by the protocol module in the same protocol conversion gateway as the standard signaling adaptation module 32, converting the first instruction into a first signaling under the preset third-party signaling standard, and sending the first signaling to a standard signaling adaptation module 32 in a protocol conversion gateway interfacing with the subordinate data platform.

When the protocol conversion gateway interfaces with a subordinate data platform, the standard signaling adaptation module 32 is configured for parsing, according to the third-party signaling standard, the received first signaling sent by a standard signaling adaptation module in a protocol conversion gateway interfacing with a superior data platform, and sending the first signaling to a protocol module 31 in the same protocol conversion gateway as this standard signaling adaptation module 32; the protocol module 31 is configured for receiving the parsed first signaling sent by the standard signaling adaptation module, converting the parsed first signaling into a second instruction under the second video cascade protocol supported by the subordinate data platform that interfaces with the subordinate protocol conversion gateway, and sending the second instruction to the subordinate data platform, and receiving a third instruction sent by the subordinate data platform to the superior data platform, parsing, according to the second video cascade protocol supported by the protocol module 31, the received third instruction sent by the subordinate data platform, and sending the third instruction to the standard signaling adaptation module 32 in the same protocol conversion gateway as this protocol module 31; wherein the third instruction is a second video cascade protocol-based instruction that is sent to the subordinate protocol conversion gateway by the subordinate data platform according to a processing result which is obtained through processing the received second instruction sent by the subordinate protocol conversion gateway by the subordinate data platform. The standard signaling adaptation module 32 is further configured for receiving a parsed third instruction sent by the protocol module in the same protocol conversion gateway as this standard signaling adaptation module 32, converting the third instruction into a second signaling under the preset third-party signaling standard, and sending the second signaling to a standard signaling adaptation module 32 in a protocol conversion gateway interfacing with the superior data platform.

The standard signaling adaptation module 32 in the protocol conversion gateway interfacing with the superior data platform is further configured for parsing, according to the third-party signaling standard, the received second signaling sent by a standard signaling adaptation module in a protocol conversion gateway interfacing with a subordinate data platform, and sending the second signaling to a protocol module 31 in the same protocol conversion gateway as this standard signaling adaptation module 32. The protocol module 31 in the protocol conversion gateway interfacing with the superior data platform is further configured for receiving the parsed second signaling sent by the standard signaling adaptation module in the same protocol conversion gateway as this protocol module 31, and converting the second signaling into a fourth instruction under the first video cascade protocol, and sending the fourth instruction to the superior data platform.

When the protocol conversion gateway interfaces with a superior data platform, the protocol conversion gateway further includes a transcoding module 33.

The transcoding module 33 is configured for receiving a video resource sent by the protocol conversion gateway that interfaces with the subordinate data platform, encapsulating the video resource according to a video encapsulation format of the superior data platform that interfaces with this transcoding module, and sending the encapsulated video resource to the superior data platform that interfaces with this transcoding module.

The standard signaling adaptation module 32 is specifically configured for parsing the contents in an instruction, calling an interface that corresponds to the contents in a set of interfaces of the preset third-party signaling standard, and generating a signaling under the third-party signaling standard containing this interface according to the contents.

Specifically, when the protocol conversion gateway supports N types of video cascade protocols, the protocol conversion gateway includes N protocol modules, and each of the protocol modules supports one type of video cascade protocol respectively; or, when the protocol conversion gateway supports N types of video cascade protocols, the protocol conversion gateway includes M protocol modules, and each of the protocol modules supports one or more types of video cascade protocols;

N is an integer greater than or equal to 2, and M is an integer less than N and greater than or equal to 1.

Figure 4:
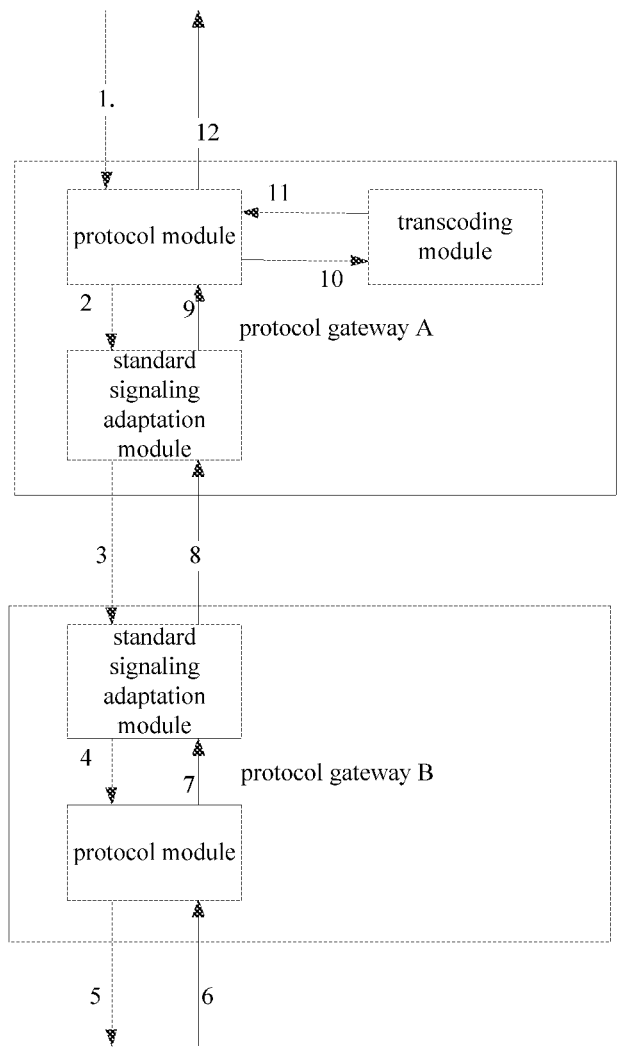
FIG. 4 is a diagram of the interaction process between a superior protocol conversion gateway and a subordinate protocol conversion gateway provided by an embodiment of the present application.

The following describes an example of the interaction between a superior protocol conversion gateway (referred to as protocol gateway A) and a subordinate protocol conversion gateway (referred to as protocol gateway B), as shown in FIG. 4.

The protocol module of the protocol gateway A receives a first instruction sent by a superior data platform to a subordinate data platform, parses the first instruction according to a first video cascade protocol supported by the protocol module, and sends the first instruction to a standard signaling adaptation module in the same protocol conversion gateway as this protocol module. The first instruction can be, for example, a directory query instruction, device query instruction, video query instruction, video search instruction, cloud platform control instruction, device restart instruction, and video download instruction, and the like.

The standard signaling adaptation module of the protocol gateway A receives the parsed first instruction sent by the protocol module in the same protocol conversion gateway as this standard signaling adaptation module, converts the first instruction into a first signaling under a preset third-party signaling standard, and sends the first signaling to the standard signaling adaptation module in the protocol gateway B interfacing with a subordinate data platform.

The standard signaling adaptation module of the protocol gateway B parses, according to the third-party signaling standard, the received first signaling sent by the standard signaling adaptation module in the protocol gateway A interfacing with the superior data platform, and sends the first signaling to the same protocol module of the protocol gateway B as this standard signaling adaptation module; the protocol module of the protocol gateway B receives the first signaling, and converts the first signaling into a second instruction under the second video cascade protocol supported by the subordinate data platform that interfaces with it, and sends the second instruction to the subordinate data platform. The protocol module of the protocol gateway B receives a third instruction sent by the subordinate data platform to the superior data platform, and parses, according to the second video cascade protocol supported by the protocol module, the received third instruction sent by the subordinate data platform, and sends the third instruction to the standard signaling adaptation module in the same protocol conversion gateway as this protocol module.

The standard signaling adaptation module of the protocol gateway B receives the parsed third instruction sent by the protocol module in the same protocol conversion gateway as this standard signaling adaptation module, converts the third instruction into a second signaling under a preset third-party signaling standard, and sends the second signaling to the standard signaling adaptation module in the protocol gateway A interfacing with the superior data platform.

The standard signaling adaptation module of the protocol gateway A parses, according to the third-party signaling standard, the received second signaling sent by the standard signaling adaptation module in the protocol gateway interfacing with the subordinate data platform, and sends the second signaling to the protocol module of the protocol gateway A, the protocol module receives the second signaling, converts the second signaling into a fourth instruction under the first video cascade protocol, and sends the fourth instruction to the superior data platform.

If the first instruction includes video resource calling information, when receiving a video resource sent by the protocol conversion gateway that interfaces with the subordinate data platform, a transcoding module in the protocol gateway A encapsulates the video resource according to a video encapsulation format of the superior data platform that interfaces with this transcoding module, and sends the encapsulated video resource to the superior data platform that interfaces with this transcoding module.

It can be seen from the technical solution above that the embodiments of the present application provide a protocol conversion method, a protocol conversion platform and a protocol conversion gateway. A superior protocol conversion gateway in the protocol conversion platform receives a first instruction sent by the first video cascade protocol-based superior data platform to the second video cascade protocol-based subordinate data platform; parses the first instruction according to the first video cascade protocol supported by the superior protocol conversion gateway; and converts the first instruction into a first signaling under a preset third-party signaling standard and sends the first signaling to the subordinate protocol conversion gateway. The subordinate protocol conversion gateway parses the first signaling, converts the first signaling into a second instruction under the second video cascade protocol supported by the subordinate data platform that interfaces with it, and sends the second instruction to the subordinate data platform. At the same time, the subordinate protocol conversion gateway receives a third instruction sent by the subordinate data platform, converts the third instruction into a second signaling under the third-party signaling standard and sends the second signaling to the superior protocol conversion gateway; the superior protocol conversion gateway parses the second signaling according to the third-party signaling standard, and converts the second signaling into a fourth instruction under the first video cascade protocol and sends the fourth instruction to the superior data platform. With the technical solution provided by the embodiments of the present application, the superior protocol conversion gateway and the subordinate protocol conversion gateway use signaling in compliance with the same third-party signaling standard, and the signaling interacted between the superior data platform and the subordinate data platform does not need to be switched between two video cascade protocols, which reduces the difficulty of developing a gateway, and facilitates the signaling interaction between the superior data platform and the subordinate data platform, and when a superior or subordinate data platform supporting a new video cascade protocol appears, it is only required to configure the superior protocol conversion gateway and the subordinate protocol conversion gateway without developing a new gateway, which further reduces workload of developing a gateway.

Figure 5:
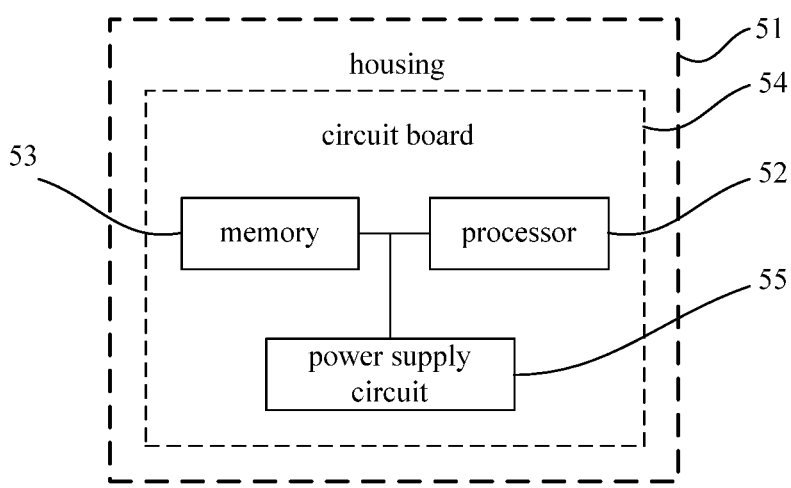
FIG. 5 is a schematic structural diagram of another protocol conversion gateway provided by an embodiment of the present application.

The embodiments of the present application further provide a protocol conversion gateway. The protocol conversion gateway interfaces with a superior data platform or with a subordinate data platform. The protocol conversion gateway supports at least one type of video cascade protocol. As shown in FIG. 5, the protocol conversion gateway includes: a housing 51, a processor 52, a memory 53, a circuit board 54, and a power supply circuit 55, wherein the circuit board 54 is disposed inside the space enclosed by the housing, the processor 52 and the memory 53 are provided on the circuit board 54, the power supply circuit 55 is configured for supplying power for various circuits or components of the protocol conversion gateway, the memory 53 is configured for storing executable program codes, and the processor 52 executes the executable program codes stored in the memory 53 for:

receiving an instruction sent by a data platform, parsing the instruction according to a video cascade protocol supported by the protocol conversion gateway; converting the instruction into a signaling under a preset third-party signaling standard, and sending the signaling converted under the third-party signaling standard to another protocol conversion gateway; and receiving a signaling under the third-party signaling standard sent by another protocol conversion gateway, parsing the received signaling according to the third-party signaling standard, and converting the parsed signaling according to the video cascade protocol supported by the protocol conversion gateway and sending the signaling to the data platform.

With the technical solution provided by the embodiments of the present application, the superior protocol conversion gateway and the subordinate protocol conversion gateway use signaling in compliance with the same third-party signaling standard, and the signaling interacted between the superior data platform and the subordinate data platform does not need to be switched between two video cascade protocols, which reduces the difficulty of developing a gateway, and facilitates the signaling interaction between the superior data platform and the subordinate data platform, and when a superior or subordinate data platform supporting a new video cascade protocol appears, it is only required to configure the superior protocol conversion gateway and the subordinate protocol conversion gateway without developing a new gateway, which further reduces workload of developing a gateway.

The embodiments of the present application provide executable program codes, which is executed to perform the protocol conversion method provided by the embodiments of the present application. The protocol conversion method can be applied to a video resource aggregation system. The video resource aggregation system includes a superior data platform, a subordinate data platform and a protocol conversion platform, wherein the superior data platform and the subordinate data platform support at least one type of video cascade protocol respectively. The protocol conversion platform includes at least one superior protocol conversion gateway that interfaces with the superior data platform, and at least one subordinate protocol conversion gateway that interfaces with the subordinate data platform. The method can include the steps of:

receiving, by the superior protocol conversion gateway, a first instruction sent by the first video cascade protocol-based superior data platform that interfaces with the superior protocol conversion gateway to the second video cascade protocol-based subordinate data platform, parsing the first instruction according to the first video cascade protocol supported by the superior protocol conversion gateway; converting the first instruction into a first signaling under a preset third-party signaling standard, and sending the first signaling to the subordinate protocol conversion gateway interfacing with the subordinate data platform;

parsing, by the subordinate protocol conversion gateway, according to the third-party signaling standard, the received first signaling sent by the superior protocol conversion gateway, converting the first signaling into a second instruction under the second video cascade protocol supported by the subordinate data platform that interfaces with the subordinate protocol conversion gateway, and sending the second instruction to the subordinate data platform;

performing, by the subordinate data platform, corresponding processing according to the received second instruction sent by the subordinate protocol conversion gateway, and sending a second video cascade protocol-based third instruction to the subordinate protocol conversion according to the result of the processing;

parsing, by the subordinate protocol conversion gateway, according to the second video cascade protocol supported by the subordinate protocol conversion gateway, the received third instruction sent by the subordinate data platform, converting the third instruction into a second signaling under the third-party signaling standard, and sending the second signaling to the superior protocol conversion gateway;

parsing, by the superior protocol conversion gateway, according to the third-party signaling standard, the received second signaling sent by the subordinate protocol conversion gateway, converting the second signaling into a fourth instruction under the first video cascade protocol, and sending the fourth instruction to the superior data platform.

With the technical solution provided by the embodiments of the present application, the superior protocol conversion gateway and the subordinate protocol conversion gateway use signaling in compliance with the same third-party signaling standard, and the signaling interacted between the superior data platform and the subordinate data platform does not need to be switched between two video cascade protocols, which reduces the difficulty of developing a gateway, and facilitates the signaling interaction between the superior data platform and the subordinate data platform, and when a superior or subordinate data platform supporting a new video cascade protocol appears, it is only required to configure the superior protocol conversion gateway and the subordinate protocol conversion gateway without developing a new gateway, which further reduces workload of developing a gateway.

The embodiments of the present application provide a storage medium, the storage medium is configured for storing executable program codes, and the executable program codes are executed to perform the protocol conversion method provided by the embodiments of the present application, wherein the protocol conversion method can be applied to a video resource aggregation system. The video resource aggregation system includes a superior data platform, a subordinate data platform and a protocol conversion platform. The superior data platform and the subordinate data platform support at least one type of video cascade protocol respectively. The protocol conversion platform includes at least one superior protocol conversion gateway that interfaces with the superior data platform, and at least one subordinate protocol conversion gateway that interfaces with the subordinate data platform. The method can include the steps:

receiving, by the superior protocol conversion gateway, a first instruction sent by the first video cascade protocol-based superior data platform that interfaces with the superior protocol conversion gateway to the second video cascade protocol-based subordinate data platform, parsing the first instruction according to the first video cascade protocol supported by the superior protocol conversion gateway; converting the first instruction into a first signaling under a preset third-party signaling standard, and sending the first signaling to the subordinate protocol conversion gateway interfacing with the subordinate data platform;

parsing, by the subordinate protocol conversion gateway, according to the third-party signaling standard, the received first signaling sent by the superior protocol conversion gateway, converting the first signaling into a second instruction under the second video cascade protocol supported by the subordinate data platform that interfaces with the subordinate protocol conversion gateway, and sending the second instruction to the subordinate data platform;

performing, by the subordinate data platform, corresponding processing according to the received second instruction sent by the subordinate protocol conversion gateway, and sending a second video cascade protocol-based third instruction to the subordinate protocol conversion according to the result of the processing;

parsing, by the subordinate protocol conversion gateway, according to the second video cascade protocol supported by the subordinate protocol conversion gateway, the received third instruction sent by the subordinate data platform, converting the third instruction into a second signaling under the third-party signaling standard, and sending the second signaling to the superior protocol conversion gateway;

parsing, by the superior protocol conversion gateway, according to the third-party signaling standard, the received second signaling sent by the subordinate protocol conversion gateway, converting the second signaling into a fourth instruction under the first video cascade protocol, and sending the fourth instruction to the superior data platform.

With the technical solution provided by the embodiments of the present application, the superior protocol conversion gateway and the subordinate protocol conversion gateway use signaling in compliance with the same third-party signaling standard, and the signaling interacted between the superior data platform and the subordinate data platform does not need to be switched between two video cascade protocols, which reduces the difficulty of developing a gateway, and facilitates the signaling interaction between the superior data platform and the subordinate data platform, and when a superior or subordinate data platform supporting a new video cascade protocol appears, it is only required to configure the superior protocol conversion gateway and the subordinate protocol conversion gateway without developing a new gateway, which further reduces workload of developing a gateway.

It needs to be noted that the relational terms used herein such as first and second are only used to distinguish one entity or operation from the other entity or operation, not necessarily requiring or implying that these entities or operations have any such practical relationship or sequence. Moreover, the terms "include", "comprise" or any variants thereof are intended to cover a non-exclusive inclusion, such that processes, methods, articles or devices including a series of elements include not only those elements listed, but also other elements not listed or the elements intrinsic to these processes, methods, articles, or devices. Without further limitations, elements limited by the wording "include(s) a/an . . . " do not exclude that there are additional identical elements in the processes, methods, articles, or devices which include the listed elements.

Various embodiments in the present application are all described using relevant manners. Same and similar parts between various embodiments may be referenced to each other. Each embodiment focuses on differences with other embodiments. Particularly, for the system embodiment, because it is substantially similar to the method embodiment, the description is relatively simple, and related parts may refer to part of description of the method embodiment.

It can be understood by a person skilled in the art that all or a part of steps in the implementations of the above method can be carried out by related hardware being instructed by programs, which can be stored in computer readable storage medium, such as ROM/RAM, disk and optical disk etc..

The embodiments described above are merely preferred embodiments of the present application, and not intended to limit the scope of the present application. Any modifications, equivalents, improvements or the like within the spirit and principle of the present application should be included in the scope of the present application.

The invention claimed is:

1. A protocol conversion platform, which is applied in a video resource aggregation system comprising a superior data platform and a subordinate data platform, wherein the superior data platform and the subordinate data platform respectively support at least one type of video cascade protocol, the protocol conversion platform comprises at least one superior protocol conversion gateway interfacing with the superior data platform, and at least one subordinate protocol conversion gateway interfacing with the subordinate data platform, the superior protocol conversion gateway is configured for receiving a first instruction sent by the superior data platform that is based on a first video cascade protocol to the subordinate data platform that is based on a second video cascade protocol, parsing the first instruction according to the first video cascade protocol supported by the superior protocol conversion gateway, converting the first instruction into a first signaling under a preset third-party signaling standard, and sending the first signaling to the subordinate protocol conversion gateway interfacing with the subordinate data platform;

the subordinate protocol conversion gateway is configured for parsing, according to the preset third-party signaling standard, the first signaling sent by the superior protocol conversion gateway, converting the first signaling into a second instruction under the second video cascade protocol supported by the subordinate data platform that interfaces with the subordinate protocol conversion gateway, and sending the second instruction to the subordinate data platform;

the subordinate protocol conversion gateway is further configured for parsing, according to the second video cascade protocol supported by the subordinate protocol conversion gateway, a third instruction sent by the subordinate data platform, converting the third instruction into a second signaling under the third-party signaling standard, and sending the second signaling to the superior protocol conversion gateway, wherein the third instruction is a second video cascade protocol-based instruction that is sent to the subordinate protocol conversion gateway by the subordinate data platform according to a processing result which is obtained through processing the second instruction sent by the subordinate protocol conversion gateway by the subordinate data platform; and the superior protocol conversion gateway is further configured for parsing, according to the third-party signaling standard, the second signaling sent by the subordinate protocol conversion gateway, converting the second signaling into a fourth instruction under the first video cascade protocol, and sending the fourth instruction to the superior data platform.

2. The protocol conversion platform of claim 1, wherein the subordinate protocol conversion gateway is further configured for receiving a video resource sent by the subordinate data platform, and sending the video resource to the superior protocol conversion gateway;

the superior protocol conversion gateway is further configured for encapsulating the video resource according to a video encapsulation format of the superior data platform, and sending the encapsulated video resource to the superior data platform.

3. The protocol conversion platform of claim 1, wherein the superior protocol conversion gateway is configured for parsing contents in the first instruction, calling an interface corresponding to the contents in a set of interfaces of the preset third-party signaling standard, and generating the first signaling under the third-party signaling standard containing this interface according to the contents;

the subordinate protocol conversion gateway is configured for converting the third instruction into the second signaling under the third-party signaling standard according to information about the interface contained in the first signaling.

4. The protocol conversion platform of claim 1, wherein when the superior data platform supports N types of video cascade protocols, the protocol conversion platform comprises N superior protocol conversion gateways, each of which interfaces with one type of superior data platform, wherein N is an integer greater than or equal to 2;

when the subordinate data platform supports M types of video cascade protocols, the protocol conversion platform comprises M subordinate protocol conversion gateways, each of which interfaces with one type of subordinate data platform, wherein M is an integer greater than or equal to 2.

5. The protocol conversion platform of claim 1, wherein when the superior data platform supports N types of video cascade protocols, the protocol conversion platform comprises S superior protocol conversion gateways, each of which interfaces with a plurality of types of superior data platforms, wherein N is an integer greater than or equal to 2 and S is an integer less than N and greater than or equal to 1;

when the subordinate data platform supports M types of video cascade protocols, the protocol conversion platform comprises T subordinate protocol conversion gateways, each of which interfaces with a plurality of types of subordinate data platforms, wherein M is an integer greater than or equal to 2 and T is an integer less than M and greater than or equal to 1.

6. A protocol conversion method, which is applied in a video resource aggregation system comprising a superior data platform, a subordinate data platform and a protocol conversion platform, wherein the superior data platform and the subordinate data platform respectively support at least one type of video cascade protocol, the protocol conversion platform comprises at least one superior protocol conversion gateway interfacing with the superior data platform, and at least one subordinate protocol conversion gateway interfacing with the subordinate data platform, the method comprises:

receiving, by the superior protocol conversion gateway, a first instruction sent by the superior data platform that is based on a first video cascade protocol and interfaces with the superior protocol conversion gateway to the subordinate data platform that is based on second video cascade protocol, parsing the first instruction according to the first video cascade protocol supported by the superior protocol conversion gateway; converting the first instruction into a first signaling under a preset third-party signaling standard, and sending the first signaling to the subordinate protocol conversion gateway interfacing with the subordinate data platform;

parsing, by the subordinate protocol conversion gateway, according to the preset third-party signaling standard, the first signaling sent by the superior protocol conversion gateway, converting the first signaling into a second instruction under the second video cascade protocol supported by the subordinate data platform that interfaces with the subordinate protocol conversion gateway, and sending the second instruction to the subordinate data platform;

performing, by the subordinate data platform, corresponding processing according to the second instruction sent by the subordinate protocol conversion gateway, and sending a second video cascade protocol-based third instruction to the subordinate protocol conversion according to a result of the processing;

parsing, by the subordinate protocol conversion gateway, according to the second video cascade protocol supported by the subordinate protocol conversion gateway, the third instruction sent by the subordinate data platform, converting the third instruction into a second signaling under the third-party signaling standard, and sending the second signaling to the superior protocol conversion gateway;

parsing, by the superior protocol conversion gateway, according to the third-party signaling standard, the second signaling sent by the subordinate protocol conversion gateway, converting the second signaling into a fourth instruction under the first video cascade protocol, and sending the fourth instruction to the superior data platform.

7. The protocol conversion method of claim 6, wherein when the first instruction contains video resource calling information, the method further comprises:
   performing, by the subordinate data platform, processing according to the second instruction, and sending a video resource to the subordinate protocol conversion gateway according to the result of the processing;
   receiving, by the subordinate protocol conversion gateway, the video resource sent by the subordinate data platform, and sending the video resource to the superior protocol conversion gateway;
   encapsulating, by the superior protocol conversion gateway, the video resource according to a video encapsulation format of the superior data platform, and sending the encapsulated video resource to the superior data platform.

8. The protocol conversion method of claim 6, wherein converting the first instruction into the first signaling under a preset third-party signaling standard comprises:
   parsing contents in the first instruction, calling an interface corresponding to the contents in a set of interfaces of the preset third-party signaling standard, and generating the first signaling under the third-party signaling standard containing this interface according to the contents;
   converting the third instruction into the second signaling under the third-party signaling standard comprises:
   converting the third instruction into the second signaling under the third-party signaling standard according to information about the interface contained in the first signaling.

9. The protocol conversion method of claim 6, wherein when the superior data platform supports N types of video cascade protocols, the protocol conversion platform comprises N superior protocol conversion gateways, each of which interfaces with one type of superior data platform, wherein N is an integer greater than or equal to 2;
   when the subordinate data platform supports M types of video cascade protocols, the protocol conversion platform comprises M subordinate protocol conversion gateways, each of which interfaces with one type of subordinate data platform, wherein M is an integer greater than or equal to 2.

10. The protocol conversion method of claim 6, wherein when the superior data platform supports N types of video cascade protocols, the protocol conversion platform comprises S superior protocol conversion gateways, each of which interfaces with a plurality of types of superior data platforms, wherein N is an integer greater than or equal to 2 and S is an integer less than N and greater than or equal to 1;
   when the subordinate data platform supports M types of video cascade protocols, the protocol conversion platform comprises T subordinate protocol conversion gateways, each of which interfaces with a plurality of types of subordinate data platforms, wherein M is an integer greater than or equal to 2 and T is an integer less than M and greater than or equal to 1.

11. A protocol conversion gateway, which interfaces with a superior data platform or with a subordinate data platform, and supports at least one type of video cascade protocol, and the protocol conversion gateway comprises: a housing, a processor, a memory, a circuit board, and a power supply circuit, wherein the circuit board is disposed inside the space enclosed by the housing, the processor and the memory are provided on the circuit board; the power supply circuit is configured for supplying power for various circuits or components of the protocol conversion gateway; the memory is configured for storing executable program codes; and the processor executes the executable program codes stored in the memory for:
   receiving an instruction sent by a data platform, parsing the instruction according to a video cascade protocol supported by the protocol conversion gateway; converting the instruction into a signaling under a preset third-party signaling standard, and sending the signaling converted under the preset third-party signaling standard to another protocol conversion gateway; and
   receiving a signaling under the third-party signaling standard sent by another protocol conversion gateway, parsing the signaling according to the third-party signaling standard, and converting the parsed signaling according to the video cascade protocol supported by the protocol conversion gateway and sending the signaling to the data platform.

12. A non-transitory storage medium, wherein the storage medium is used for storing executable program codes, which is executed to implement the protocol conversion method of claim 6.

13. The protocol conversion gateway of claim 11, wherein,
   when the protocol conversion gateway interfaces with the superior data platform, the processor executes the executable program codes stored in the memory for: receiving a first instruction sent by the superior data platform to the subordinate data platform, parsing the first instruction according to a first video cascade protocol supported by the protocol conversion gateway, converting the first instruction into a first signaling under the preset third-party signaling standard, and sending the first signaling to a further protocol conversion gateway interfacing with the subordinate data platform;
   when the protocol conversion gateway interfaces with the subordinate data platform, the processor executes the executable program codes stored in the memory for:
   parsing, according to the preset third-party signaling standard, the first signaling sent by a further protocol conversion gateway interfacing with the superior data platform; converting the first signaling into a second instruction under a second video cascade protocol supported by the subordinate data platform, and sending the second instruction to the subordinate data platform; receiving a third instruction sent by the subordinate data platform to the superior data platform, parsing the third instruction according to the second video cascade protocol supported by the protocol conversion gateway, wherein the third instruction is a second video cascade protocol-based instruction that is sent to the protocol conversion gateway by the subordinate data platform according to a processing result which is obtained through processing the second instruction sent by the protocol conversion gateway by the subordinate data platform; converting the third instruction into a second signaling under the preset third-party signaling standard, and sending the second signaling to the further protocol conversion gateway interfacing with the superior data platform;

when the protocol conversion gateway interfaces with the superior data platform, the processor further executes the executable program codes stored in the memory for:
parsing, according to the preset third-party signaling standard, the second signaling sent by the further protocol conversion gateway interfacing with the subordinate data platform, converting the second signaling into a fourth instruction under the first video cascade protocol, and sending the fourth instruction to the superior data platform.

14. The protocol conversion gateway of claim 11, wherein when the protocol conversion gateway interfaces with the superior data platform, the processor executes the executable program codes stored in the memory for:
receiving a video resource sent by the protocol conversion gateway that interfaces with the subordinate data platform, encapsulating the video resource according to a video encapsulation format of the superior data platform that interfaces with the protocol conversion gateway, and sending the encapsulated video resource to the superior data platform that interfaces with the protocol conversion gateway.

15. The protocol conversion gateway of claim 11, wherein the processor further executes the executable program codes stored in the memory for:
parsing contents in the instruction, calling an interface corresponding to the contents in a set of interfaces of the preset third-party signaling standard, and generating the first signaling under the third-party signaling standard containing this interface according to the contents.

16. The protocol conversion gateway of claim 11, wherein when the protocol conversion gateway supports N types of video cascade protocols, N is an integer greater than or equal to 2.

* * * * *